Jan. 10, 1933.    H. T. LYMAN, JR    1,893,781
ELECTRIC REGULATOR
Filed April 17, 1931
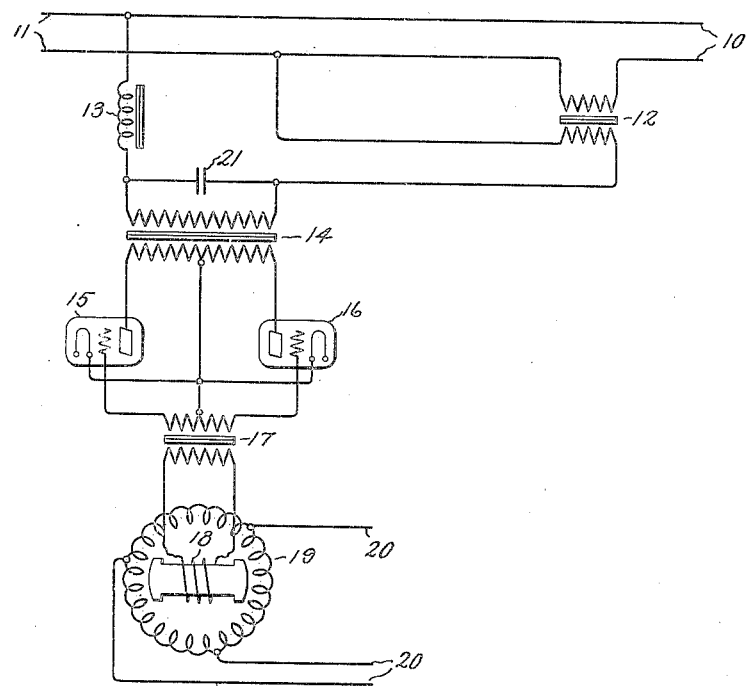
Inventor:
Harold T. Lyman Jr;
by Charles V. Tullar
His Attorney.

Patented Jan. 10, 1933

1,893,781

UNITED STATES PATENT OFFICE

HAROLD T. LYMAN, JR., OF SCHENECTADY, NEW YORK, ASSIGNOR TO GENERAL ELECTRIC COMPANY, A CORPORATION OF NEW YORK

ELECTRIC REGULATOR

Application filed April 17, 1931. Serial No. 530,892.

My invention relates to apparatus for regulating an electrical condition of an alternating current circuit, and more particularly to an electrical regulating apparatus utilizing electric valves which is particularly suitable for regulating the voltage of an alternating current feeder circuit.

Heretofore there have been devised numerous arrangements for regulating the voltage or other electrical condition of an alternating current circuit. Certain of these arrangements involve the use of contacts and other moving parts which tend to become unreliable in operation and are subject to wear and other deterioration in use. Certain other regulating apparatus have been devised utilizing electric valves for effecting the desired regulation. Examples of this latter type are disclosed and claimed in the copending applications of A. Boyajian, filed April 17, 1931, Serial No. 530,880, and G. W. Garman, filed April 17, 1931, Serial No. 530,881 assigned to the same assignee as the present application. My invention relates to the type of regulating apparatus disclosed in the above-mentioned applications which broadly claim certain features of the apparatus disclosed in this application.

It is an object of my invention to provide an improved regulating apparatus utilizing electric valves which have a sufficiently large capacity to carry the regulating power current.

It is a further object of my invention to provide an improved regulating apparatus utilizing electric valves which will require a minimum number of elements, and at the same time will not introduce objectionable harmonics into the regulated circuit.

It is a still further object of my invention to provide an improved regulating apparatus utilizing electric valves in which an increased fineness of regulation may be obtained.

In accordance with my invention I provide an alternating current circuit with a booster transformer and energize the primary winding of this transformer from the circuit through an impedance transformer. The secondary winding of the impedance transformer is shunted through a pair of electric valves, the conductivity of which is controlled by shifting the phase of the grid potentials with respect to the anode potentials of these valves. A filter circuit is introduced in the primary circuit of the booster transformer in order to suppress objectionable harmonics from the output circuit.

For a better understanding of my invention, together with other and further objects thereof, reference is had to the following description taken in connection with the accompanying drawing, and its scope will be pointed out in the appended claims. The single figure of the accompanying drawing illustrates one embodiment of my invention for regulating the voltage of an alternating current feeder circuit.

Referring now to the drawing, I have illustrated an apparatus for regulating the voltage of an alternating current load circuit 10 energized from an alternating current supply circuit 11. This apparatus comprises a booster transformer 12 provided with a secondary winding interconnecting the circuits and with a primary winding connected across the supply circuit through a reactor 13 and impedance transformer 14. The secondary winding of the impedance transformer 14 is provided with an electrical mid-point which is connected to the two outer terminals of this winding through a pair of electric valves 15 and 16. The electric valves 15 and 16 are each provided with an anode, a cathode, and a control grid, and may be of any of the several types well-known in the art, although I prefer to use valves of the vapor electric discharge type in which the starting of the current in the valve is determined by the potential on its control grid but in which current flowing through the valve may be interrupted only by reducing its anode potential below the critical value. The grids of the electric valves 15 and 16 are connected to the common cathode circuit through opposite halves of the secondary winding of a grid transformer 17, the primary winding of which is energized from any suitable source of alternating potential variable in phase such, for example, as the single phase secondary winding 18 of a rotary phase shifting transformer 19 energized from a suitable polyphase circuit 20. A capacitor 21 connected across the secondary winding of transformer 14 together with the reactor 13 comprises a filter circuit for suppressing harmonics from the load circuit 10.

In explaining the operation of the above described apparatus it will be assumed that the voltage of the load circuit 10 has dropped below normal due to an increase in load or to any other cause. The secondary member 18 of the phase shifting transformer 19 is now rotated in such a direction as to advance the phase of the grid potentials of the valves 15 and 16 with respect to their anode potentials so that these valves each become conducting at an earlier point in their respective half cycles of positive anode potential. The result is that the effective impedance of the valves 15 and 16 is decreased and with it the reflected impedance of the primary winding of the transformer 14 so that the excitation of the primary winding of the booster transformer 12 is increased to bring the voltage of the circuit 10 back to normal. Obviously, upon an increase of the voltage of the circuit 10 above normal the member 18 is rotated in opposite direction to produce a reverse effect. It will be well understood by those skilled in the art that, with the type of valve and grid control described above, the current flowing in impedance transformer 14 will comprise a series of half sine waves of opposite polarity with the initial portion of each half wave chopped off, the amount of this portion of each half wave which is cut off increasing as the phase of the grid potentials of the valves 15 and 16 is retarded with respect to their anode potentials. This mutilation of the sine wave of current which would normally flow in impedance transformer 14 gives rise to higher harmonics which are objectionable if allowed to flow in the load circuit 10. However, with the provision of capacitor 21 and reactor 13 tuned to approximately the fundamental frequency of the power circuit these higher harmonics may be substantially suppressed from the load circuit 10 so that the wave form of the current and voltage of this circuit is substantially sinusoidal.

While I have disclosed a specific arrangement for manually shifting the phase of the grid potentials of electric valves 15 and 16 it will be obvious to those skilled in the art that any desired automatic arrangement for shifting the phase of the grid potentials in response to variations in the voltage of the regulated circuit may be used without departing from my invention. Examples of such automatic phase shifting arrangements will be found in the above-mentioned Garman application, or in the copending application of A. S. FitzGerald and F. L. Gaines, filed April 17, 1931, Serial No. 530,888, assigned to the same assignee as the present application.

While I have described what I at present consider the preferred embodiment of my invention, it will be obvious to those skilled in the art that various changes and modifications may be made without departing from my invention and I, therefore, aim in the appended claims to cover all such changes and modifications as fall within the true spirit and scope of my invention.

What I claim as new and desire to secure by Letters Patent of the United States is:

1. The combination of an alternating current supply circuit, a booster transformer provided with primary and secondary windings, a load circuit connected to said supply circuit through said secondary winding, an impedance device, a filter circuit, said primary winding being connected to said supply circuit through said impedance device and said filter circuit, electric valve means shunting said impedance device for controlling the impedance thereof, and means for controlling the conductivity of said valves.

2. The combination of an alternating current supply circuit, a booster transformer provided with primary and secondary windings, a load circuit connected to said supply circuit through said secondary winding, an impedance device, a reactor, said primary winding being connected to said supply circuit through said impedance device and said reactor, a capacitor connected across said impedance device, said reactor and capacitor being tuned to substantially the frequency of said supply circuit, electric valve means shunting said impedance device for controlling the impedance thereof, and means for controlling the conductivity of said valves.

3. The combination of an alternating current supply circuit, a booster transformer provided with primary and secondary windings, a load circuit connected to said supply circuit through said secondary winding, an impedance transformer provided with primary and secondary windings, the primary windings of said transformers being serially connected across said supply circuit, a pair of electric valves shunting the secondary winding of said impedance transformer, and means for varying the conductivity of said valves.

4. The combination of an alternating current supply circuit, a booster transformer provided with primary and secondary windings, a load circuit connected to said supply circuit through said secondary winding, an impedance transformer provided with primary and secondary windings, the primary windings of said transformers being serially connected across said supply circuit, a pair of electric valves, each provided with an anode, a cathode and a control grid, connected between the outer terminals of the secondary winding of said impedance transformer to bypass energy therefrom, and means for shifting the phase of the grid potentials of said valves with respect to their anode potentials.

In witness whereof, I have hereunto set my hand.

HAROLD T. LYMAN, Jr.